United States Patent
Kim

(10) Patent No.: US 12,162,351 B2
(45) Date of Patent: Dec. 10, 2024

(54) APPARATUS FOR ASSISTING DRIVING

(71) Applicant: HL KLEMOVE CORP., Incheon (KR)

(72) Inventor: Deokju Kim, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 553 days.

(21) Appl. No.: 17/345,123

(22) Filed: Jun. 11, 2021

(65) Prior Publication Data

US 2021/0387524 A1 Dec. 16, 2021

(30) Foreign Application Priority Data

Jun. 11, 2020 (KR) .................. 10-2020-0070908

(51) Int. Cl.
| | | |
|---|---|---|
| B60K 31/00 | (2006.01) | |
| B60K 35/00 | (2006.01) | |
| G06V 20/56 | (2022.01) | |
| G06V 20/58 | (2022.01) | |
| G08G 1/0967 | (2006.01) | |
| B60K 35/28 | (2024.01) | |

(52) U.S. Cl.
CPC .......... B60K 31/0066 (2013.01); B60K 35/00 (2013.01); G06V 20/582 (2022.01); G06V 20/588 (2022.01); G08G 1/096725 (2013.01); *B60K 35/28* (2024.01); *B60K 2360/168* (2024.01)

(58) Field of Classification Search
None
See application file for complete search history.

(56) References Cited

U.S. PATENT DOCUMENTS

| | | | |
|---|---|---|---|
| 11,427,251 B2 * | 8/2022 | Taniguchi | ........... B60R 16/0231 |
| 2019/0126933 A1 * | 5/2019 | Jonasson | ............ B60W 40/072 |
| 2019/0325349 A1 * | 10/2019 | Zhang | .................. G06V 20/582 |
| 2021/0347360 A1 * | 11/2021 | de la Garza Villarreal | ................. B60W 40/04 |

FOREIGN PATENT DOCUMENTS

| | | | | |
|---|---|---|---|---|
| KR | 10-2019-0100856 A | 8/2019 | | |
| WO | WO-2013017775 A1 * | 2/2013 | ............. | B60K 37/02 |
| WO | WO-2015178841 A1 * | 11/2015 | .......... | B60W 30/143 |

OTHER PUBLICATIONS

Translation of WO 2013/017775 (Nicolas et al.) (Year: 2013).*

* cited by examiner

*Primary Examiner* — Peter D Nolan
*Assistant Examiner* — Michael F Whalen
(74) *Attorney, Agent, or Firm* — Hauptman Ham, LLP

(57) ABSTRACT

An aspect of the disclosure provides an apparatus and a method for assisting driving capable of calculating a speed limit of a vehicle using curvature information of a road and accurately recognizing a traffic sign through this. The apparatus for assisting driving of a host vehicle includes a front sensor mounted to the host vehicle and having a field of view in front of the host vehicle, the front sensor configured to obtain front image data; and a controller including a processor configured to process the front image data. The controller may be configured to detect a speed displayed on a sign based on the front image data, to calculate a limit speed of the host vehicle on a driving road based on the front image data, and to display a sign speed smaller than the limit speed on a display of the host vehicle.

13 Claims, 5 Drawing Sheets

APPARATUS FOR ASSISTING DRIVING

CROSS-REFERENCE TO RELATED APPLICATION(S)

This application is based on and claims priority under 35 U.S.C. § 119 to Korean Patent Application No. 10-2020-0070908, filed on Jun. 11, 2020, the disclosure of which is incorporated herein by reference.

BACKGROUND

1. Field

The disclosure relates to a driver assistance system, and more particularly, to a driver assistance system capable of recognizing a speed of a sign.

2. Description of Related Art

Generally, vehicles refer to moving means or transportation means that drive on road or tracks using fossil fuel, electricity, or the like as a power source. The vehicles are able to move to various locations on one or more wheels mounted onto the frame of the vehicle. Such vehicles may be classified into three-wheel or four-wheel vehicles, a bus, a medium-large truck, a two-wheel vehicle such as a motorcycle, construction machinery, bicycles, trains driving along rails on tracks, and the like.

With the development of automotive technology, there are advantages of traveling long distances but problems also often arise as traffic conditions worsen and traffic jams increase where population densities are high.

To relieve burdens and increase convenience of a driver, recent studies regarding vehicles provided with an Advanced Driver Assist System (ADAS) that actively provides information regarding a state of the vehicle, a state of the driver, and surrounding conditions are actively ongoing.

An example of the ADAS provided within the vehicle includes a Traffic Signs Recognition (TSR). The TSR recognizes a traffic sign through a front camera while driving and displays information on the cluster to provide a driver with information about a speed limit of the road being driven and warn them to prevent traffic accidents caused by speeding.

However, an error may occur in a recognition of the traffic sign in a situation where road properties are changed, such as at a junction.

SUMMARY

An aspect of the disclosure provides a driver assistance system capable of calculating a speed limit of a vehicle using curvature information of a road and accurately recognizing a traffic sign through this, and a driver assistance method.

Additional aspects of the disclosure will be set forth in part in the description which follows and, in part, will be obvious from the description, or may be learned by practice of the disclosure.

According to an aspect of the disclosure, there is provided an apparatus for assisting driving of a host vehicle, the apparatus including: a front sensor mounted to the host vehicle and having a field of view in front of the host vehicle, the front sensor configured to obtain front image data; and a controller including a processor configured to process the front image data. The controller may be configured to detect a speed displayed on a sign based on the front image data, to calculate a limit speed of the host vehicle on a driving road based on the front image data, and to transmit data to a display of the host vehicle to display a sign speed smaller than the limit speed.

The controller may be configured to calculate a curvature of the driving road based on the front image data, and to calculate the limit speed of the host vehicle based on the calculated curvature.

Based on a speed of the host vehicle being greater than the sign speed, the controller may be configured to reduce the speed of the host vehicle.

Based on a speed of the host vehicle being greater than the sign speed, the controller may be configured to reduce the speed of the host vehicle below the sign speed.

Based on a curvature and a maximum lateral acceleration of the host vehicle, the controller may be configured to calculate the limit speed of the host vehicle.

The front sensor may include a camera.

According to another aspect of the disclosure, there is provided a method for assisting driving of a host vehicle, the method including: obtaining, by a camera mounted to the host vehicle and having a field of view in front of the host vehicle, front image data of the host vehicle; detecting, by a controller, a speed displayed on a sign based on the front image data; calculating, by the controller, a limit speed of the host vehicle on a driving road based on the front image data; and transmitting, by the controller, data to a display of the host vehicle to display a sign speed smaller than the limit speed on a display.

The calculating of the limit speed may include calculating a curvature of the driving road based on the front image data; and calculating the limit speed of the host vehicle based on the calculated curvature.

The method may further include, based on a speed of the host vehicle being greater than the sign speed, reducing, by the controller, the speed of the host vehicle.

The method may further include, based on a speed of the host vehicle being greater than the sign speed, reducing, by the controller, the speed of the host vehicle below the sign speed.

The calculating of the limit speed may include, based on a curvature and a maximum lateral acceleration of the host vehicle, calculating the limit speed of the host vehicle.

According to another aspect of the disclosure, there is provided a system for assisting driving of a host vehicle, the system including: a display; a front sensor mounted to the host vehicle and having a field of view in front of the host vehicle, the front sensor configured to obtain front image data; and a controller including a processor configured to process the front image data, wherein the controller is configured to: detect a speed displayed on a sign based on the front image data, calculate a limit speed of the host vehicle on a driving road based on the front image data, and control the display to display a sign speed smaller than the limit speed.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
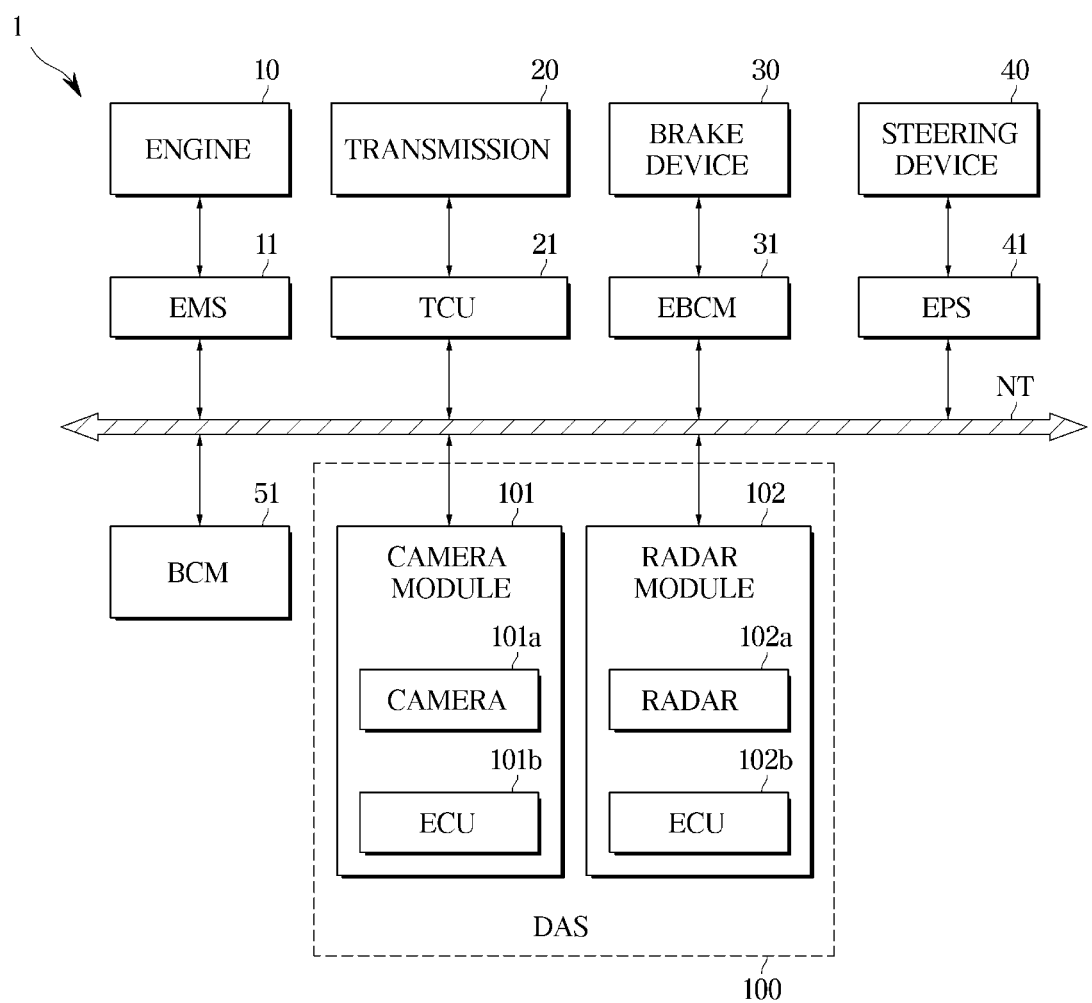
FIG. 1 is a view illustrating a configuration of a vehicle according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, operation principles and embodiments of the disclosure will be described with reference to accompanying drawings.

FIG. 1 is a view illustrating a configuration of a vehicle according to an embodiment.

Referring to FIG. 1, a vehicle 1 may include an engine 10, a transmission 20, a braking device 30, and a steering device 40. The engine 10 may include a cylinder and a piston, and may generate power for the vehicle 1 to drive. The transmission 20 may include a plurality of gears, and may transmit power generated by the engine 10 to wheels. The braking device 30 may decelerate or stop the vehicle 1 through friction with the wheels. The steering device 40 may change a driving direction of the vehicle 1.

The vehicle 1 may include a plurality of electrical components. For example, the vehicle 1 further includes an engine management system (EMS) 11, a transmission control unit (TCU) 21, and an electronic brake control module (EBCM) 31), an electronic power steering (EPS) 41, a body control module (BCM), and a driver assistance system (DAS) 100.

The EMS 11 may control the engine 10 in response to an acceleration intent of a driver through an accelerator pedal or a request of the DAS 100. For example, the EMS 11 may control torque of the engine 10.

The TCU 21 may control the transmission 20 in response to a shift command of the driver through a shift lever and/or a driving speed of the vehicle 1. For example, the TCU 21 may adjust the gear ratio from the engine 10 to the vehicle wheels.

The EBCM 31 may control the braking device 30 in response to a braking intent of a driver through a braking pedal and/or a slip of the vehicle wheels. For example, the EBCM 31 may temporarily release the braking of the vehicle wheel in response to a slip of the vehicle wheel sensed at a time of braking of the vehicle 1 (anti-lock braking systems, ABS). The EBCM 31 may selectively release braking of the vehicle wheel in response to oversteering and/or under-steering sensed at a time of steering of the vehicle 1 (electronic stability control, ESC). In addition, the EBCM 31 may temporarily brake the vehicle wheels in response to a slip of the vehicle wheel sensed at a time of driving of the vehicle 1 (traction control system, TCS).

The EPS 41 may assist the operation of the steering device 40 so that the driver easily manipulates a steering wheel, in response to a steering intent of the driver through the steering wheel. For example, the EPS 41 may assist the operation of the steering device 40 such that the steering force is reduced during low-velocity traveling or parking and is increased during high-velocity traveling.

The BCM 51 may control the operation of the electronic components that provide convenience to the driver or ensure the safety of the driver. For example, the BCM 51 may control a head lamp, a wiper, a cluster, a multifunction switch, a turn signal lamp, and the like.

The DAS 100 may assist the driver in manipulating (driving, braking, steering) the vehicle 1. For example, the DAS 100 may detect an environment of a road on which the vehicle 1 is driving (e.g., other vehicles, pedestrians, cyclists, lanes, road signs, etc.).

The DAS 100 may provide various functions to the driver. For example, the DAS 100 may include lane departure warning (LDW), lane keeping assist (LKA), high beam assist (HBA), autonomous emergency braking (AEB), traffic signs recognition (TSR), smart cruise control (SCC), and blind spot detection (BSD).

The DAS 100 may include a camera module 101 for obtaining image data around the vehicle 1 and a radar module 102 for obtaining object data around the vehicle 1. The camera module 101 may include a camera 101a and an electronic control unit (ECU) 101b, and may capture the front of the vehicle 1 and recognize other vehicles, pedestrians, cyclists, lanes, road signs, and the like. The radar module 102 may include a radio detecting and ranging (radar) 102a and an electronic control unit (ECU) 102b, and may obtain relative positions and relative speeds of objects (e.g., other vehicles, pedestrians, cyclists, and the like) around the vehicle 1.

The DAS 100 is not limited to that illustrated in FIG. 1, and may further include a Light Detection And Ranging (LiDAR) that scans around the vehicle 1 and detects the object.

The above described electronic components may communicate with each other through a vehicle communication network NT. For example, the electrical components may exchange data therebetween through Ethernet, media oriented systems transport (MOST), Flexray, controller area network (CAN), local interconnect network (LIN), and the like. For example, the DAS 100 may transmit a driving signal, a braking signal, and a steering signal to the EMS 11, the EBCM 31, and the EPS 41, respectively, through the NT.

Figure 2:
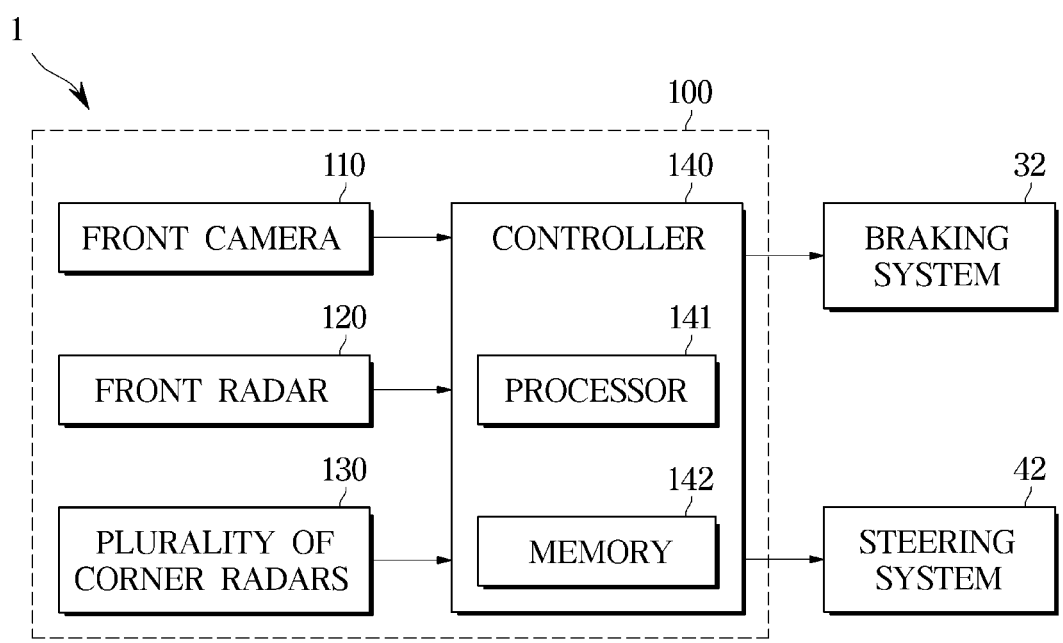
FIG. 2 is a view illustrating a configuration of a driver assistance system according to an embodiment.
Figure 3:
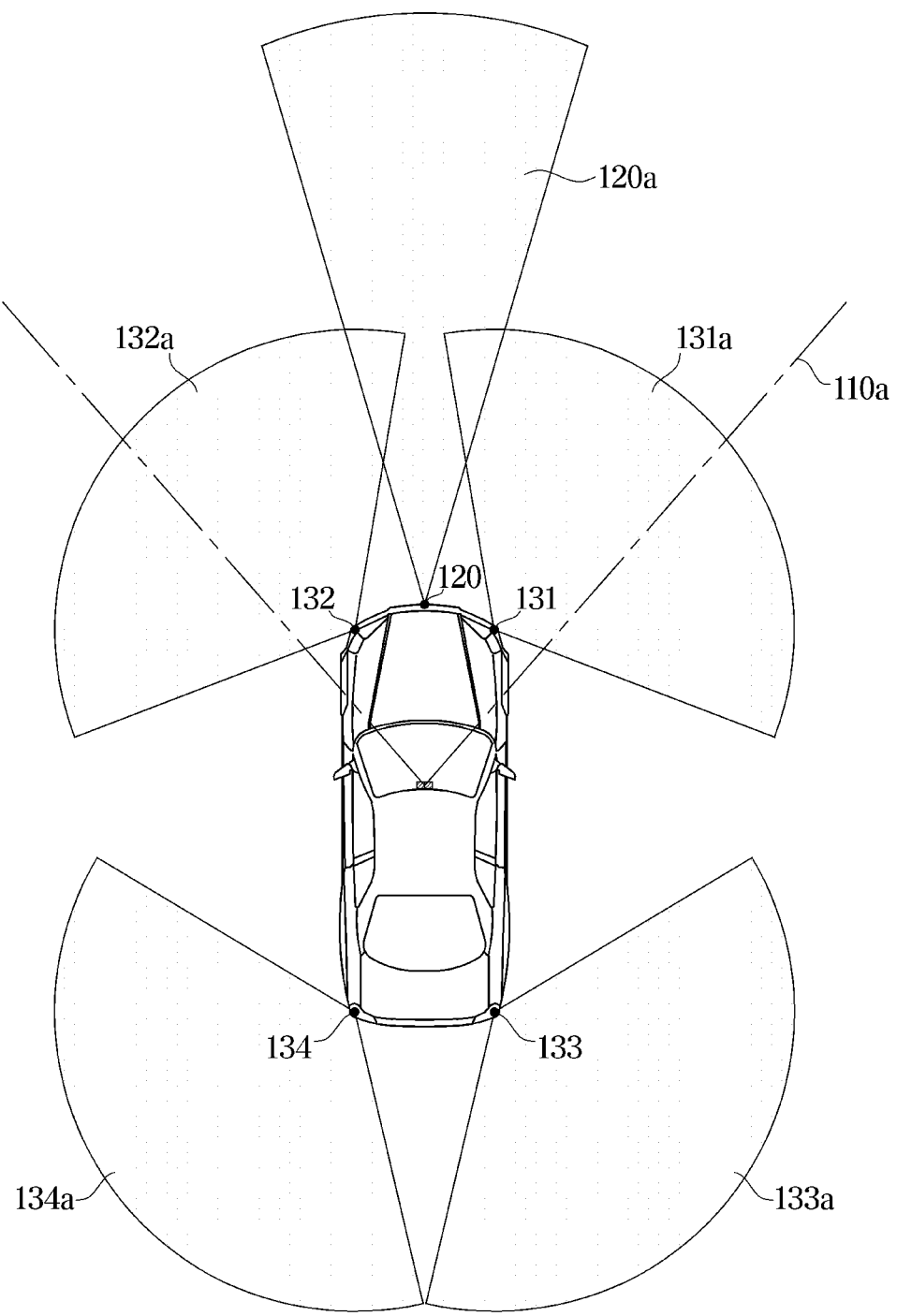
FIG. 3 is a diagram illustrating a camera and a radar included in a driver assistance system according to an embodiment.

FIG. 2 is a view illustrating a configuration of a driver assistance system according to an embodiment, and FIG. 3 is a diagram illustrating a camera and a radar included in a driver assistance system according to an embodiment.

Referring to FIG. 2, the vehicle 1 may include a braking system 32, a steering system 42, and the DAS 100.

The braking system 32 may include the EBCM 31 (see FIG. 1) and the braking device 30 (see FIG. 1) described in conjunction with FIG. 1, and the steering system 42 may include the EPS 41 (see FIG. 1) and the steering device 40 (see FIG. 1).

The DAS 100 may include a front camera 110, a front radar 120, and a plurality of corner radars 130.

Referring to FIG. 3, the front camera 110 may have a field of view 110*a* directed to the front of the vehicle 1. The front camera 110 may be installed, for example, on a front windshield of the vehicle 1.

The front camera 110 may image the front of the vehicle 1 and obtain image data regarding the front of the vehicle 1. The image data regarding the front of the vehicle 1 may include position information about at least one of other vehicles, pedestrians, cyclists, lanes, curbs, guardrails, street trees, and streetlights located in front of the vehicle 1.

The front camera 110 may image the front of the vehicle 1 and obtain image data regarding the front of the vehicle 1. The image data regarding the front of the vehicle 1 may include a position with respect to other vehicles or signs or pedestrians or cyclists or lanes located in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to a controller 140. For example, the front camera 110 may be connected to the controller 140 through the vehicle communication network NT, through a hard wire, or through a printed circuit board (PCB).

The front camera 110 may transmit the image data regarding the front of the vehicle 1 to the controller 140.

The front radar 120 may have a field of sensing 120*a* directed to the front of the vehicle 1. The front radar 120 may be installed, for example, on a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an obstacle. The front radar 120 may obtain front radar data from the transmission radio waves transmitted by the transmission antenna and the reflection radio waves received by the reception antenna. The front radar data may include position information and velocity information regarding an obstacle, such as other vehicles, pedestrians, or cyclists existing in front of the vehicle 1. The front radar 120 may calculate the relative distance to the obstacle based on the phase difference (or time difference) between the transmission radio waves and the reflection radio waves, and calculate the relative speed of the object based on the frequency difference between the transmission radio waves and the reflected radio waves.

The front radar 120 may be connected to the controller 140 through the vehicle communication network NT, the hard wire, or the PCB. The front radar 120 may transmit the front radar data to the controller 140.

The plurality of corner radars 130 may include a first corner radar 131 mounted to a forward right side of the vehicle 1, a second corner radar 132 mounted to a forward left side of the vehicle 1, a third corner radar 133 mounted to a rear right side of the vehicle 1, and a fourth corner radar 134 mounted to a rear left side of the vehicle 1.

As illustrated in FIG. 3, the first corner radar 131 may include a field of sensing (FOS) 131*a* oriented to a forward right area of the vehicle 1. For example, the forward-view radar 120 may be mounted to a right side of a front bumper of the vehicle 1. The second corner radar 132 may include an FOS 132*a* oriented to a forward left area of the vehicle 1, and may be mounted to, for example, a left side of the front bumper of the vehicle 1. The third corner radar 133 may include an FOS 133*a* oriented to a rear right area of the vehicle 1, and may be mounted to, for example, a right side of a rear bumper of the vehicle 1. The fourth corner radar 134 may include an FOS 134*a* oriented to a rear left area of the vehicle 1, and may be mounted to, for example, a left side of the rear bumper of the vehicle 1.

Each of the first, second, third, and fourth radars 131, 132, 133, and 134 may include a transmission (Tx) antenna and a reception (Rx) antenna. The first, second, third, and fourth corner radars 131, 132, 133, and 134 may respectively obtain first corner radar data, second corner radar data, third corner radar data, and fourth corner radar data. The first corner radar data may include information about a distance between the vehicle 1 and the object (e.g., other vehicles, pedestrians, or cyclists) present in a forward right area of the vehicle 1, and information about a speed of the object. The second corner radar data may include information about a distance between the vehicle 1 and an object (e.g., other vehicles, pedestrians, or cyclists) present in a forward left area of the vehicle 1, and information about a speed of the object. The third corner radar data may include information about a distance between the vehicle 1 and an object (e.g., other vehicles, pedestrians, or cyclists) present in a rear right area of the vehicle 1, and information about a speed of the object. The fourth corner radar data may include information about a distance between the vehicle 1 and an object (e.g., other vehicles, pedestrians, or cyclists) present in a rear left area of the vehicle 1, and information about a speed of the object.

Each of the first, second, third, and fourth corner radars 131, 132, 133, and 134 may be connected to the controller 140 through, for example, the vehicle communication network NT, the hard wire, or the PCB. The first, second, third, and fourth corner radars 131, 132, 133, and 134 may respectively transmit first corner radar data, second corner radar data, third corner radar data, and fourth corner radar data to the controller 140.

The controller 140 may include the ECU 101b (see FIG. 1) of the camera module 101 (see FIG. 1) and/or the ECU 102b (see FIG. 1) of the radar module 102 (see FIG. 1), and/or an integrated ECU.

The controller 140 includes a processor 141 and a memory 142.

The processor 141 may process front image data of the front camera 110, the front radar data of the front radar 120, and the corner radar data of the plurality of corner radars 130, and may generate a braking signal and a steering signal for controlling the braking system 32 and the steering system 42.

For example, the processor 141 may include an image signal processor for processing the front image data of the front camera 110 and/or a digital signal processor for processing the radar data of the radars 120 and 130 and/or a micro control unit (Micro Control Unit, MCU) for generating the braking signal and the steering signal.

The processor 141 may detect the objects (for example, other vehicles, pedestrians, cyclists, etc.) in front of the vehicle 1 based on the front image data of the front camera 110 and the front radar data of the front radar 120.

The processor 141 may obtain a position (distance and direction) and a relative speed of the objects in front of the vehicle 1 based on the front radar data of the front radar 120. The processor 141 may obtain the position (direction) and type information (e.g., whether the object is another vehicle or the pedestrian, or the cyclist, etc.) of the objects in front of the vehicle 1 based on the front image data of the front camera 110.

In addition, the processor 141 may match the objects detected by the front image data to the objects detected by the front radar data, and obtain the type information, the position, and the relative speed of the objects in front of the vehicle 1 based on a result of the matching.

The processor 141 may generate the braking signal and the steering signal based on the type information, the position, and the relative speed of front objects.

The memory 142 may store programs and/or data for processing image data by the processor 141, programs and/or data for processing radar data by the processor 141, and programs and/or data for generating the braking signal and/or the steering signal by the processor 141.

The memory 142 may temporarily memorize the image data received from the front camera 110 and/or the radar data received from the radars 120 and 130, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

The DAS 100 is not limited to that illustrated in FIG. 2, and may further include the LiDAR that scans around the vehicle 1 and detects the object.

On the other hand, a TSR system may be a system that can prevent traffic accidents caused by speeding by providing speed limit information of a driving road to the driver and warning by recognizing general and electronic traffic signs through the front camera 110 while driving the vehicle 1 and displaying the information on the cluster.

In general, when a branch line diverges from a main line, such as a highway entry point, there are two signs, one indicating the speed limit of the main line and the other indicating the speed limit of a branch line.

For example, the sign of the main line indicating a speed limit of 100 km/h and the sign of the branch line indicating a speed limit of 50 km/h may exist together at a road junction.

In this case, the vehicle 1 may drive on the branch line, and the sign indicating the speed limit of the main line may be recognized.

Conversely, the vehicle 1 may drive on the main line, but the sign indicating the speed limit of the branch line is recognized, and incorrect speed limit information may be provided to the driver.

The disclosed embodiment may provide the DAS 100 capable of excluding the speed limit of the sign indicating an unnecessary speed limit by calculating a curvature of the road using the front image data obtained from the front camera 110 and calculating a limit speed of the vehicle 1 based on this.

Figure 4:
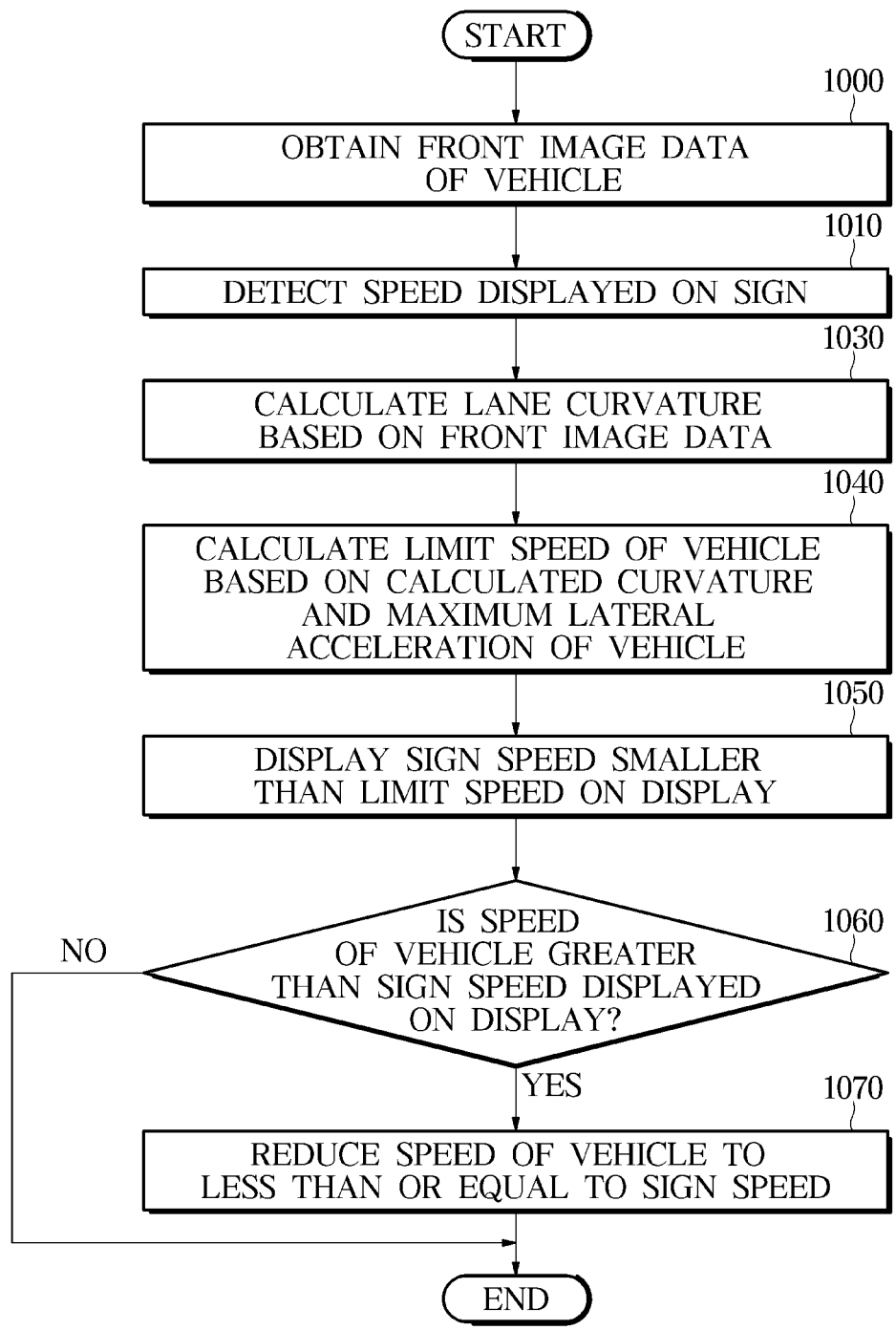
FIG. 4 is a flowchart of a driver assistance method according to an embodiment.
Figure 5:
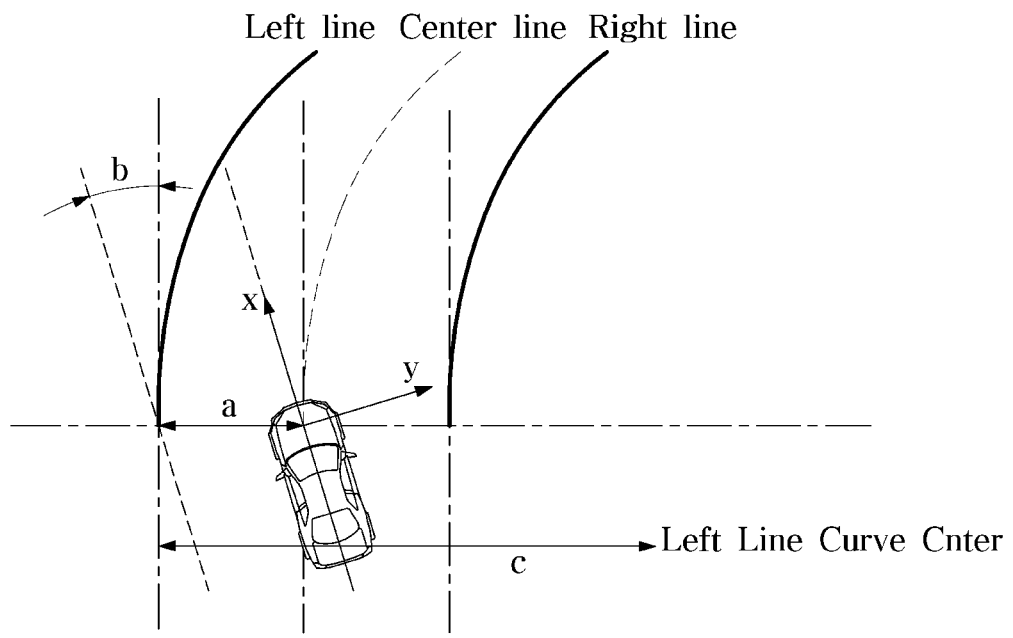
FIG. 5 is a view illustrating information for calculating a curvature of a lane in which a vehicle is driving according to an embodiment.

FIG. 4 is a flowchart of a driver assistance method according to an embodiment, and FIG. 5 is a view illustrating information for calculating a curvature of a lane in which a vehicle is driving according to an embodiment.

Referring to FIG. 4, the front camera 110 of the vehicle 1 may obtain the image of the front of the vehicle 1 (1000). The controller 140 may recognize the signs from a front image obtained from the front camera 110 and detect the speed limit displayed on the sign (1010). The controller 140 may calculate the curvature of the road on which the vehicle 1 is driving based on the front image data (1030).

The controller 140 may calculate the limit speed of the vehicle 1 to be described later, and based on this, determine the sign indicating the speed limit suitable for a lane in which the vehicle 1 is driving.

The controller 140 may calculate the curvature of the lane from a cubic equation according to Equation 1 below.

$$Y(x) = C_0 + C_1 \cdot x + C_2 \cdot x^2 + C_3 \cdot x^3 \qquad \text{[Equation 1]}$$

$C_0$: left line lateral deviation
$C_1$: left line heading angle
$C_2$: left line curvature
$C_3$: left line curvature deviation The controller 140 derives the cubic equation according to Equation 1 having the above-described coefficients based on the front image data obtained from the front camera 110. In Equation 1, $C_0$ corresponds to reference numeral a, $C_1$ corresponds to reference numeral b, and $C_2$ corresponds to reference numeral c in FIG. 5.

The controller 140 continuously differentiates the cubic equation according to Equation 1 to calculate the curvature of the lane in which the vehicle 1 is currently driving.

The controller 140 may calculate the limit speed of the vehicle 1 based on the calculated curvature and a maximum lateral acceleration of the vehicle 1 (1040).

When the curvature of the lane in which the vehicle 1 is driving is calculated, the controller 140 may calculate a limit speed V of the vehicle 1 based on Equation 2 below.

$$V_{Circle}(m/s) = \sqrt{a_{lateral\_max}(m/s^2) * R(m)} \qquad \text{[Equation 2]}$$

V: limit speed of vehicle (m/s)
a: maximum lateral acceleration (m/s2)
R: curvature by vehicle (m)

The controller 140 may calculate the curvature of the lane on which the vehicle 1 is driving through Equation 1, and calculate the limit speed of the vehicle 1 by applying the calculated curvature to Equation 2. For example, when a curvature R of the lane is calculated to be 900 m through the front image data obtained from the front camera 110, the vehicle 1 may drive up to a maximum lateral acceleration of 3 m/s2, so the controller 140 may calculate the expected road limit speed on the driving road to about 52 km/h through Equation 2.

When the limit speed is calculated, the controller 140 may display a sign smaller than the limit speed on the display (1050).

For example, since the calculated limit speed of the vehicle 1 is 52 km/h, the controller 140 may display a speed limit of 50 km/h, which is smaller than the calculated limit speed of 52 km/h, on the display such as the cluster, and may provide speed limit information of the sign suitable for the currently driving lane to the driver.

When the driving speed of the vehicle 1 is greater than the speed of the sign displayed on the display (1060), the controller 140 may reduce the speed of the vehicle 1 so that the speed of the vehicle 1 is less than or equal to the speed of the displayed sign (1070).

When the sign suitable for the lane in which the vehicle 1 is driving is determined, the controller 140 may display the determined speed limit of the sign on the display, as described above. When the current driving speed of the vehicle 1 is greater than the speed limit displayed on the display, the controller 140 may reduce the speed of the vehicle 1 so that the speed of the vehicle 1 is equal to or less than the speed limit displayed on the display. A vehicle speed automatic deceleration control may be selectively executed by the driver.

According to the disclosed embodiments, when two or more signs displaying different speed information are detected, unnecessary sign speed information may be excluded based on the calculated speed limit of the vehicle.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An apparatus for assisting driving of a host vehicle, the apparatus comprising:
    a front sensor mounted to the host vehicle and having a field of view in front of the host vehicle, the front sensor being configured to obtain front image data; and
    a controller including a processor configured to process the front image data,
    wherein the controller is configured to:
        in response to detecting a first speed sign displaying a first sign speed based on the front image data and detecting a second speed sign displaying a second sign speed different from the first sign speed based on the front image data, determine one of the first sign speed or the second sign speed as being a speed limit corresponding to a driving road over which the host vehicle travels,
        wherein to determine the one of the first sign speed or the second sign speed as being the speed limit corresponding to the driving road, the controller is configured to:
            calculate a curvature of the driving road based on the front image data,
            calculate a limit speed of the host vehicle on the driving road based on the calculated curvature,
            compare the limit speed to the first sign speed and the second sign speed to determine one of the first sign speed or the second sign speed as being a closest sign speed to the limit speed without exceeding the limit speed, and
            recognize the one of the first sign speed or the second sign speed determined as being the closest speed to the limit speed without exceeding the limit speed as the speed limit corresponding to the driving road, and
        transmit data to a display of the host vehicle to display the speed limit corresponding to the driving road.

2. The apparatus according to claim 1, wherein the controller is further configured to:
    reduce a moving speed of the host vehicle in response to determining the moving speed of the host vehicle is greater than the speed limit corresponding to the driving road.

3. The apparatus according to claim 1, wherein the controller is further configured to:
    reduce a moving speed of the host vehicle to a speed below the speed limit corresponding to the driving road in response to determining the moving speed of the host vehicle is greater than the speed limit corresponding to the driving road.

4. The apparatus according to claim 1, wherein the controller is configured to calculate the limit speed based on the curvature and a maximum lateral acceleration of the host vehicle.

5. The apparatus according to claim 1, wherein the front sensor comprises a camera.

6. A method for assisting driving of a host vehicle, the method comprising:
- obtaining, by a camera mounted to the host vehicle and having a field of view in front of the host vehicle, front image data of the host vehicle;
- in response to detecting, by a controller, a first speed sign displaying a first sign speed based on the front image data and detecting a second speed sign displaying a second sign speed different from the first sign speed based on the front image data, determining one of the first sign speed or the second sign speed as being a speed limit corresponding to a driving road over which the host vehicle travels,
- wherein the determining the one of the first sign speed or the second sign speed as being the speed limit corresponding to the driving road, comprises:
  - calculating a curvature of the driving road based on the front image data;
  - calculating, by the controller, a limit speed of the host vehicle on the driving road based on the calculated curvature;
  - comparing the limit speed to the first sign speed and the second sign speed to determine one of the first sign speed or the second sign speed as being a closest sign speed to the limit speed without exceeding the limit speed; and
  - recognizing the one of the first sign speed or the second sign speed determined as being the closest sign speed to the limit speed without exceeding the limit speed as the speed limit corresponding to the driving road; and
- transmitting, by the controller, data to a display of the host vehicle to display the speed limit corresponding to the driving road.

7. The method according to claim 6, further comprising:
reducing a moving speed of the host vehicle in response to determining the moving speed of the host vehicle is greater than the speed limit corresponding to the driving road.

8. The method according to claim 6, further comprising:
reducing a moving speed of the host vehicle to a speed below the speed limit corresponding to the driving road in response to determining the moving speed of the host vehicle is greater than the speed limit corresponding to the driving road.

9. The method according to claim 6, wherein the calculating of the limit speed is further based on a maximum lateral acceleration of the host vehicle.

10. A system for assisting driving of a host vehicle, the apparatus comprising:
- a display;
- a front sensor mounted to the host vehicle and having a field of view in front of the host vehicle, the front sensor configured to obtain front image data; and
- a controller including a processor configured to process the front image data, wherein the controller is configured to:
  - in response to detecting a first speed sign displaying a first sign speed based on the front image data and detecting a second speed sign displaying a second sign speed different from the first sign speed based on the front image data, determine one of the first sign speed or the second sign speed as being a speed limit corresponding to a driving road over which the host vehicle travels,
  - wherein to determine the one of the first sign speed or the second sign speed as being the speed limit corresponding to the driving road, the controller is configured to:
    - calculate a curvature of the driving road based on the front image data,
    - calculate a limit speed of the host vehicle on the driving road based on the calculated curvature,
    - compare the limit speed to the first sign speed and the second sign speed to determine one of the first sign speed or the second sign speed as being a closest sign speed to the limit speed without exceeding the limit speed, and
    - recognize the one of the first sign speed or the second sign speed determined as being the closest sign speed to the limit speed without exceeding the limit speed
  - as the speed limit corresponding to the driving road, and
  - control the display to display the speed limit corresponding to the driving road.

11. The system according to claim 10, wherein the controller is further configured to:
reduce a moving speed of the host vehicle in response to determining the moving speed of the host vehicle is greater than the speed limit corresponding to the driving road.

12. The system according to claim 10, wherein the controller is further configured to:
reduce a moving speed of the host vehicle to a speed below the speed limit corresponding to the driving road in response to determining the moving speed of the host vehicle is greater than the speed limit corresponding to the driving road.

13. The system according to claim 10, wherein the controller is configured to calculate the limit speed based on the curvature and a maximum lateral acceleration of the host vehicle.

* * * * *